(12) United States Patent
Bhan

(10) Patent No.: US 10,676,680 B2
(45) Date of Patent: Jun. 9, 2020

(54) CATALYST FOR THE HYDROTREATMENT OF A HEAVY HYDROCARBON FEEDSTOCK

(71) Applicant: SHELL OIL COMPANY, Houston, TX (US)

(72) Inventor: Opinder Kishan Bhan, Katy, TX (US)

(73) Assignee: Shell Oil Company, Houston, TX (US)

( * ) Notice: Subject to any disclaimer, the term of this patent is extended or adjusted under 35 U.S.C. 154(b) by 148 days.

(21) Appl. No.: 16/038,969

(22) Filed: Jul. 18, 2018

(65) Prior Publication Data

US 2018/0320091 A1 Nov. 8, 2018

Related U.S. Application Data

(62) Division of application No. 14/514,532, filed on Oct. 15, 2014, now Pat. No. 10,077,406.

(60) Provisional application No. 61/892,024, filed on Oct. 17, 2013.

(51) Int. Cl.
*B01J 21/04* (2006.01)
*B01J 23/883* (2006.01)
*B01J 35/10* (2006.01)
*B01J 37/02* (2006.01)
*B01J 37/08* (2006.01)
*B01J 37/28* (2006.01)
*C10G 45/08* (2006.01)

(52) U.S. Cl.
CPC .............. *C10G 45/08* (2013.01); *B01J 21/04* (2013.01); *B01J 23/883* (2013.01); *B01J 35/1019* (2013.01); *B01J 35/1061* (2013.01); *B01J 37/0201* (2013.01); *B01J 37/088* (2013.01); *B01J 37/28* (2013.01)

(58) Field of Classification Search
None
See application file for complete search history.

*Primary Examiner* — Colin W. Slifka
(74) *Attorney, Agent, or Firm* — Charles W. Stewart

(57) ABSTRACT

Disclosed is a method of hydrotreating a heavy hydrocarbon feedstock using a hydrotreating catalyst having specific properties that make it effective in converting nitrogen, sulfur and micro-carbon residue of a heavy hydrocarbon feedstock. The catalyst comprises a calcined support particle impregnated with a Group 6 metal component (e.g., molybdenum), a nickel component, and a phosphorus component present at concentrations in the catalyst such that the atomic ratio of the Group 6 metal-to nickel metal are within a specified range. The nickel metal acid extractability property of the catalyst is at least 50 percent.

19 Claims, 2 Drawing Sheets

CATALYST FOR THE HYDROTREATMENT OF A HEAVY HYDROCARBON FEEDSTOCK

This application is a divisional of U.S. application Ser. No. 14/514,532 filed Oct. 15, 2014, now U.S. Pat. No. 10,077,406, which claims the benefit of United States Patent Application No. 61/892,024 filed Oct. 17, 2013, which is incorporated herein by reference.

FIELD OF THE INVENTION

This invention relates to a catalyst composition, a method of making the catalyst composition and use thereof in the hydrotreatment of heavy hydrocarbon feedstocks.

BACKGROUND OF THE INVENTION

The catalytic hydrotreatment of hydrocarbon feedstock to remove impurities such as sulfur, nitrogen, and metal compounds is a commonly used process to improve or upgrade such hydrocarbon feedstock. This treatment to remove sulfur and nitrogen from heavy hydrocarbon feedstock is necessary due to various environmental regulations implemented by the United States and other countries. For example, the maximum sulfur concentration in on-road diesel is 15 parts per million (ppm) in the United States. Other organizations are pushing for limits as low as 5 to 10 ppm sulfur in diesel.

In a typical hydrotreating process, the hydrocarbon feedstock is contacted with a hydrotreating catalyst in the presence of hydrogen under process conditions that provide for a treated hydrocarbon product. The hydrotreating catalysts used in these processes generally are composed of an active phase that can include a component from the Group 6 metals, e.g. molybdenum (Mo) or tungsten (W), and a component from either the Group 9 metals, e.g. cobalt (Co), or the Group 10 metals, e.g. nickel (Ni), or a combination thereof, supported on a porous, refractory inorganic oxide material. The references herein to the elements by grouping within the periodic table are as they are listed and defined by the International Union of Pure and Applied Chemistry (IUPAC) Periodic Table of the Elements.

The hydrotreatment of heavy hydrocarbon feedstock is particularly difficult; because, such feeds tend to have high concentrations of contaminating sulfur and nitrogen compounds and may require the use of more severe process conditions than those needed to treat lighter hydrocarbon feedstock. As the quality of feedstock declines, the reaction conditions required to achieve a desired level of hydrotreatment tend to become more severe (e.g., increased temperatures or pressures). This increases production costs and causes more rapid depletion of catalyst activity.

There is a continuing need for improving catalyst performance to offset the decreasing quality of feedstock and the increased processing costs associated therewith. In particular, the ability of a catalyst to achieve acceptable sulfur and nitrogen removal at lower temperatures is quite valuable; because, lower temperatures require less energy input which directly reduces production costs.

One catalyst found to be useful in the hydroprocessing of heavy hydrocarbon feedstocks is disclosed in U.S. Pat. No. 4,738,944 (Robinson et al.). The catalyst disclosed in this patent contains nickel, phosphorus and molybdenum supported on alumina, and it contains up to about 10, usually from 1 to 8 percent, and preferably from 2 to 6 percent by weight of nickel metal components, calculated as the monoxide. The catalyst also contains from about 16 to about 23 and preferably from 19 to 21.5 percent by weight molybdenum metal components, calculated as molybdenum trioxide ($MoO_3$). The pore structure of the catalyst is such that it has a narrow pore size distribution with at least about 75 percent, preferably at least about 80 percent, and most preferably at least about 85 percent of the total pore volume in pores of diameter from about 50 to about 110 angstroms. Ordinarily, the catalyst has less than about 10 percent of its total pore volume in pores of diameter below about 50 angstroms.

Another hydroprocessing catalyst is disclosed in U.S. Pat. No. 7,824,541 (Bhan) that is particularly useful in the treatment of distillate feedstocks to manufacture low-sulfur distillate products. This catalyst is a co-mulled mixture of molybdenum trioxide, a Group VIII metal compound, and an inorganic oxide material. The co-mulled mixture is calcined. The molybdenum content of the catalyst is in the range of from 10.5 to 33 wt. %, calculated as an oxide. If the Group VIII metal component is nickel, it is present in the catalyst in the range of from 3.8 to 15.3 wt. %, calculated as an oxide. The catalyst also has a mean pore diameter that is in a specific and narrow range of from 50 to 100 angstroms. There is less than 4.5 percent of the total pore volume that is contained in its macropores having pore diameters greater than 350 angstroms and less than 1 percent of the total pore volume contained in its macropores having pore diameters greater than 1000 angstroms.

Disclosed in U.S. Pat. No. 7,871,513 (Bhan) is a catalyst that is useful in the hydroprocessing of heavy hydrocarbon feedstocks. This catalyst is a calcined mixture made by calcination of a formed particle of a mixture comprising molybdenum trioxide, a nickel compound, and an inorganic oxide material. The molybdenum content of the catalyst is in the range upwardly to 18 wt. %, calculated as an oxide. The nickel content of the catalyst is in the range upwardly to 5.1 wt. %, calculated as an oxide. The molybdenum source used in the preparation of the catalyst is in the form of molybdenum trioxide that is in a finely divided state.

While the catalysts described above have been shown to have good hydroprocessing activity, there are continuing efforts to find new or improved catalyst compositions having increased catalytic activity or improved stability, or both. Any improvement in catalyst activity can result in the lowering of required reactor temperatures to obtain a product with reduced concentrations of nitrogen or sulfur as compared to a feedstock that is contaminated with these components. The lower reactor temperatures provide for energy savings and will extend the life of a catalyst. There also are ongoing efforts to find more economical methods of manufacturing the catalyst compositions.

SUMMARY OF THE INVENTION

In one aspect, the invention encompasses a method of making a catalyst composition useful in the hydrotreatment of a heavy hydrocarbon feedstock. The method comprises the steps of providing a calcined support particle, comprising an inorganic oxide material; impregnating the calcined support particle with an aqueous impregnation solution, wherein the aqueous impregnation solution comprises a Group 6 metal compound, a nickel compound and a phosphorus compound, and wherein the aqueous impregnation solution has an atomic ratio of nickel metal-to-Group 6 metal that is in the range of from 0.5 and 0.75, to thereby provide an impregnated support particle; and conducting a controlled low-temperature calcination of the impregnated support particle so as to thereby provide a calcined catalyst particle having a nickel metal acid extractability property of at least 50%.

In another aspect, the invention encompasses a catalyst composition, comprising a calcined particle, wherein the calcined particle comprises an impregnated calcined support particle, having been subjected to a controlled low-temperature calcination to provide the calcined particle, wherein the calcined particle comprises a Group 6 metal component and a nickel component in proportions such that the atomic ratio of the nickel metal to the Group 6 metal is in the range of from 0.5 and 0.75, and wherein the calcined particle has a nickel metal acid extractability property of at least 50%.

DETAILED DESCRIPTION OF THE INVENTION

Figure 1:
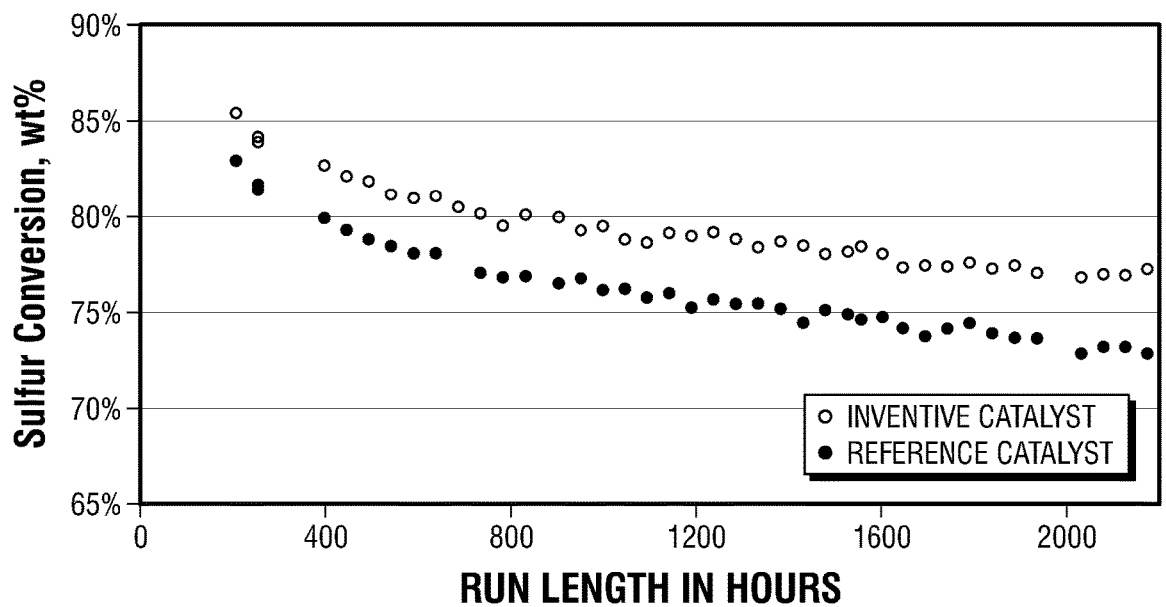
FIG. 1 is a graph illustrating the sulfur conversion achieved by use in hydrotreating a heavy feedstock of a composition that is representative of an inventive catalyst produced according to the invention in comparison to the sulfur conversion achieved with a reference catalyst.

A novel catalyst composition has been discovered that is especially useful in the hydrotreatment of heavy hydrocarbon feedstocks that have significant concentrations of sulfur, nitrogen, metals such as vanadium and nickel, and micro-carbon residue (MCR). This catalyst composition exhibits exceptional nitrogen, sulfur, and MCR conversion activity at lower operating temperatures than comparative catalysts.

The inventive catalyst composition comprises a calcined particle that comprises a calcined support particle that has been impregnated with catalytic metals and thereafter subjected to a low-temperature calcination. The calcined support particle used in the preparation of the calcined particle, or catalyst composition, comprises an inorganic oxide support material (e.g., alumina) that has been agglomerated and calcined under a high-temperature calcination condition to thereby provide the calcined support particle. This calcined support particle is impregnated with a Group 6 metal (e.g., molybdenum) component, a nickel component and a phosphorus component in such relative proportions that the atomic ratio of the nickel metal-to-Group 6 metal in the resulting impregnated calcined support particle is within a specific range as hereafter defined. The impregnated calcined support particle is subjected to a controlled low-temperature calcination to provide the final calcined particle, or catalyst composition, having a nickel metal acid extractability property, as defined hereinafter, of at least 50%.

In the preparation of the inventive catalyst composition, the calcined support particle is impregnated with an impregnation solution which comprises either active metal compounds or active metal precursors that are present in the impregnation solution in specifically defined proportions. One of the essential features of the invention is for the impregnation solution to have certain compositional and other properties that cooperate with other features of the invention to give the final calcined catalyst particle of the catalyst composition having enhanced catalytic properties. Among these features, it is important for the calcined support particle used in the preparation of the inventive catalyst to be prepared in a specific way such that its properties will work together with the other aspects of the composition and preparation method to provide the final catalyst composition of the invention having improved properties as described herein.

The calcined support particle used in the preparation of the inventive catalyst comprises an inorganic oxide material selected from a group of inorganic oxides that typically are used to carry catalytically active metal components. Suitable inorganic oxides can include porous inorganic refractory oxides, such as, for example, silica, alumina, and silica-alumina, that provide the surface structure properties required for the inventive catalyst. Particulate or powder alumina or silica-alumina is preferred with particulate or powder alumina being most preferred.

To prepare the calcined support particle, the inorganic oxide material is shaped or formed or agglomerated into a particle that is calcined under a specifically defined high-temperature calcination condition that provides the inventive catalyst composition having its special and enhanced catalytic properties when the high-temperature calcination is done in combination with the low-temperature calcination of the impregnated calcined support particle and with the impregnation of the calcined support particle with an impregnation solution having particularly defined properties.

The support particle may be formed or shaped or agglomerated by any suitable method known to those skilled in the art provided that the support particle can subsequently be heat treated or calcined in accordance with the invention to provide a calcined support particle having the necessary properties of the invention. Examples of known shaping methods include rolling, tableting, pelletizing, and extruding.

It is preferred to use an extrusion method to form the shaped support particle that is calcined to provide the calcined support particle used in preparing the inventive catalyst composition. To make the shaped support particle by this method, the starting inorganic oxide material is mixed with water and a suitable acid compound, in proportions and in a manner so as to form an extrudable paste suitable for extruding through an extrusion die to thereby form an extrudate.

In certain embodiments of the invention, the support particle is made by mixing a nickel compound with the starting inorganic oxide material so as to provide a small concentration of nickel in the calcined support particle. This nickel concentration can be in the range of upwardly to about 3 weight percent of the calcined support particle, based on the nickel as an oxide, regardless of its actual form in the calcined support particle. The nickel compound may, for example, be selected from such compounds as nickel oxide, nickel nitrate, nickel carbonate, nickel acetate, nickel chloride, and nickel sulfate, with the preferred nickel compound being either nickel oxide or nickel nitrate.

If nickel is to be incorporated into the support particle of the invention, a desirable concentration of the nickel therein is in the range of from 0.1 wt. % to 2 wt. % of the calcined support particle, based on the nickel as an oxide. A more desirable concentration of nickel in the calcined support particle is in the range of from 0.5 wt. % to 1.5 wt. %.

The formed extrudate used as the shaped support particle used in providing the calcined support particle of the invention may have any cross-sectional shape such as cylindrical shapes, polylobal shapes or any other suitable shape. A typical size of extrudate has a cross-sectional diameter in the range of from about 1/10 inch (2.54 mm) to 1/32 inch (0.79 mm) and a length-to-diameter ratio in the range of from 2:1 to 5:1. The preferred shape is a tri-lobe.

The shaped support particle is then dried under standard drying conditions that can include a drying temperature in the range of from 50° C. to 200° C., preferably, from 75° C. to 175° C., and, most preferably, from 90° C. to 150° C.

It is a significant, if not a critical, feature of the invention that the shaped support particle, after its drying, is calcined under a high-temperature calcination condition. What is meant herein by a high-temperature calcination condition is that the temperature at which the shaped support particle is calcined is elevated in relationship to the temperature at which the impregnated support particle is calcined.

It is believed that one aspect of the invention that is responsible for the enhanced properties of the inventive catalyst composition is that the calcination of the support particle is conducted at a significantly higher calcination temperature than the calcination temperature at which the impregnated support particle is calcined. This is thought to be because the different calcination temperatures have different affects upon the resulting physical properties, such as pore structure, of the materials being calcined.

The high-temperature calcination of the shaped support particle is conducted in the presence of an oxygen-containing fluid, such as air, at a temperature that is preferably elevated above the temperature at which the impregnated support particle undergoes its calcination. In general, the temperature at which the shaped support particle is calcined to provide the calcined support particle is in the range of from 450° C. (842° F.) to 760° C. (1400° F.). The preferred calcination temperature is in the range of from 510° C. (950° F.) to 730° C. (1346° F.), and, more preferred, it is from 540° C. (1004° F.) to 705° C. (1301° F.).

The time period under which the shaped support particle is calcined is such as is necessary to provide the calcined support particle having the necessary properties required for the invention, but, typically, it is in the range of from about 0.25 hours to 10 hours. More typically, period time for which the shaped support particle is calcined is from 0.5 to 6 hours.

The mean pore diameter of the calcined support particle is typically in the range of from 50 Å to 150 Å. More typically, the mean pore diameter is in the range of form 80 Å to 120 Å, or in the range of from 90 Å to no Å.

The calcined support particle can have a surface area (determined by the BET method employing $N_2$, ASTM test method D 3037) that is in the range of from 150 $m^2/g$ to 350 $m^2/g$, preferably, from 200 $m^2/g$ to 320 $m^2/g$, and, most preferably, from 220 $m^2/g$ to 300 $m^2/g$.

The Hg pore volume of the calcined support particle can be in the range of from 0.4 cc/g to 1.1 cc/g, preferably, from 0.5 cc/g to 1.0 cc/g, and, most preferably, from 0.6 cc/g to 0.9 cc/g.

Another important feature of the invention requires the metals impregnation solution that is used to incorporate the catalytic metals into the calcined support particle to be an aqueous impregnation solution. The aqueous impregnation solution comprises a Group 6 metal (e.g., molybdenum) component, a nickel component, and a phosphorous component that are present at concentrations such that the atomic ratio of nickel metal-to-Group 6 metal are within a specifically defined and narrow range, as hereafter defined.

It is believed that the atomic ratio of nickel metal-to-Group 6 metal atomic of the aqueous impregnation solution affects its properties and the way the nickel atoms move onto the surfaces of the molybdenum atoms or molybdenum stacks that are formed in the final calcined catalyst particle. It is undesirable for the nickel atoms to move toward or be incorporated onto the alumina surfaces instead of residing upon the other metals that are incorporated onto the calcined support particle.

It is thought also that there is a relationship between the pH of the aqueous impregnation solution and its nickel metal-to-Group 6 metal atomic ratio, and that the pH of the aqueous impregnation solution further impacts in some way the distribution of these metal components within the calcined support particle when it is impregnated with the aqueous impregnation solution.

Taking these factors into consideration, it has been found that it is advantageous for the atomic ratio of nickel metal-to-Group 6 metal in the aqueous impregnation solution of the invention to be in the range of from 0.4 to 0.8 and, in an embodiment, for the pH of the aqueous impregnation solution to be in the range up to about 4. It is preferred for the atomic ratio of nickel metal-to-Group 6 metal to be range in the range of from 0.45 to 0.75, and, more preferred, from 0.5 to 0.7.

The pH of the aqueous impregnation solution should be in the range of from 0.1 to 4, and, preferably, the pH is in the range of from 0.5 to 3.5. It is more preferred for the pH to be in the range of from 0.75 to 3.

To prepare the aqueous impregnation solution, the Group 6 metal component, nickel component, and phosphorous component are mixed together with water and dissolved. Slight heating of the mixture may be applied as required to help in dissolving the components, and a suitable acid may be used to assist in the dissolution of the components and to provide for an aqueous impregnation solution having the necessary pH as described above. Typically, a suitable acid can include a mineral acid such as nitric acid.

Among the Group 6 metals of chromium, molybdenum, and tungsten that might suitably be used in the preparation of the aqueous impregnation solution, molybdenum is preferred. Molybdenum compounds that may suitably be used in the preparation of the aqueous impregnation solution include, but are limited to, molybdenum trioxide and ammonium molybate. Molybdenum trioxide is the preferred molybdenum compound used in the preparation of the aqueous impregnation solution.

The molybdenum concentration in the impregnation solution that is incorporated into the calcined support particle to provide the impregnated calcined particle should be such as to provide for the final calcined particle having a molybdenum content in the range upwardly to 18 weight percent (wt. % calculated as $MoO_3$), with the weight percent being based on the total weight of the calcined particle. Also, the molybdenum content of the calcined particle should be equal to or greater than 9 wt. %, calculated as $MoO_3$. However, it is desirable for the amount of molybdenum that is contained in the impregnation solution to be such as to provide a calcined particle having a molybdenum content in the range of from 9 to 18 wt. %, but, preferably, from 12 to 17.5 wt. %, and, most preferably, from 12.8 to 17.0 wt. % (calculated as $MoO_3$).

Nickel compounds suitable for use in the preparation of the aqueous impregnation solution include, but are not limited to, nickel hydroxides, nickel nitrates, nickel acetates, and nickel oxides. Nickel oxide and nickel nitrate are the preferred nickel compounds with nickel oxide being the most preferred.

The amount of nickel contained in the aqueous impregnation solution should be such as to provide for a calcined particle having a nickel content in the range upwardly to 7 weight percent (wt % calculated as NiO), with the weight percent being based on the total weight of the calcined particle. Also, the nickel content of the calcined particle should be equal to or greater than 2 wt. %, calculated as NiO. However, it is desirable for the amount of the nickel compound that is contained in the aqueous impregnation solution to be such as to provide for the calcined particle having nickel content in the range of from 2 to 7 wt. %, but, preferably, from 2.5 to 4.8 wt. % and, most preferably, from 3 to 4.3 wt. % (calculated as NiO).

The phosphorus compound used in the preparation of the aqueous impregnation solution typically is in the form of a phosphorous containing solution that is prepared using a salt compound of phosphorus or an oxyacid of phosphorus. Suitable salt compounds include, but are not limited, to phosphate compounds with a cation such as sodium, potassium, rubidium, cesium, or ammonium, or any of the aqueous forms of phosphate (e.g. phosphate ion ($PO_4^{3-}$), hydrogen phosphate ion ($HPO_4^{2-}$), dihydrogen phosphate ion ($H_2PO_4^{-}$) and trihydrogen phosphate ($H_3PO_4$)). Suitable oxyacids of phosphorus include but are not limited to phosphorous acid ($H_3PO_3$), phosphoric acid ($H_3PO_4$), hydrophosphorous acid ($H_3PO_2$).

The amount of phosphorus contained in the aqueous impregnation solution is such as to provide a calcined particle having a phosphorus content in the range of from 0.8 wt. % to 4 wt. % phosphorous, based on the total dry weight of the calcined particle calculated assuming the phosphorus is in the form of phosphorus pentoxide ($P_2O_5$). Preferably, the concentration of phosphorus pentoxide in the calcined particle is in the range of from 1 wt. % to 3.75 wt. %, and, most preferably, the concentration is in the range of from 1.25 wt. % to 3.5 wt. %.

In an embodiment of the invention, the difference between the amount of phosphorus in the calcined catalyst particle and the amount of Group 6 metal in the calcined catalyst particle is maintained at or above a specified level. The total quantity of phosphorus in the calcined particle (calculated as phosphorus pentoxide) should be more than 5% of the total quantity of Group 6 metal present in the calcined catalyst particle (calculated as an oxide) and less than 30%. In a preferred embodiment, molybdenum is the preferred Group 6 metal and the total quantity of phosphorus in the calcined catalyst particle (calculated as phosphorus pentoxide) is greater than 10% of the total quantity of molybdenum in the calcined catalyst particle (calculated as molybdenum trioxide) and less than 30%.

In preparing the catalyst composition of the invention, the calcined support particle is impregnated with the aforedescribed aqueous impregnation solution by any of the suitable known impregnation methods, such as, spray impregnation, soaking, multi-dip procedures, and incipient wetness impregnation, to provide the impregnated support particle.

The impregnated support particle is then dried to remove a portion of the free water or volatiles content from the impregnated support particle. The drying temperature is typically in the range of from about 75° C. to 250° C. The time period for drying the impregnated support particles is any suitable period of time necessary to provide for the desired amount of reduction in the volatile content of the particles prior to the controlled low-temperature calcination of the impregnated support particle.

A critical feature of the invention is for the impregnated support particle to undergo a controlled, low-temperature calcination to provide the final calcined particle of the inventive catalyst composition. As noted above, a feature of the invention involves the high-temperature calcination of the support particle in combination with the low-temperature calcination of the impregnated calcined support particle to provide the final catalyst composition having enhanced catalytic properties. What is meant herein by low-temperature calcination is that the temperature under which the impregnated support particle is calcined is comparatively lower than the temperature under which the formed support particle of the catalyst composition is calcined.

It is important for the low-temperature calcination to be controlled so that the calcination temperature is maintained at the lower temperatures required in order to minimize the amount of nickel of the impregnated support particle that moves into the lattice structure of the alumina of the impregnated support particle or that reacts with the alumina of the impregnated support particle to form nickel aluminate. The binding of the nickel atoms with the alumina is an undesired result of calcination at higher temperatures, and, thus, the calcination temperature needs to be controlled in a manner so as to minimize this effect.

The calcination temperature may be adjusted or controlled or set so as to provide a final calcined catalyst particle that has a certain specified nickel metal acid extractability property (as defined below). The nickel metal acid extractability property of the calcined catalyst particle is an indicator of how tightly the nickel content is bound to the alumina as opposed to sitting upon the surfaces of the molybdenum or molybdenum stacks contained within the calcined catalyst particle. A lower percentage of nickel that is extracted from the calcined catalyst particle is indicative of a high percentage of nickel that is tightly or strongly bound to the catalyst matrix potentially in the form of nickel aluminate. A high percentage of nickel that is extracted from the calcined catalyst particle, on the other hand, is indicative of a high percentage of nickel that is loosely held within the structure of the calcined catalyst particle, thus, suggesting that the loosely held nickel is residing upon the surfaces of the molybdenum or molybdenum stacks.

The low-temperature calcination of the impregnated support particle is preferably controlled so as to provide a calcined catalyst particle having a desired percentage nickel metal acid extractability property, as hereinafter expressed. This calcination step is conducted in the presence of an oxygen-containing fluid, such as air, at a temperature that is lower than the temperature at which the formed support particle is calcined that yields the calcined support particle, typically, at a low-temperature calcination temperature that is less than 450° C. (842° F.).

More specifically, the temperature at which the low-temperature calcination of the impregnated support is conducted is in the range of from 300° C. (572° F.) to or less than 450° C. (842° F.). A preferred low-temperature calcination temperature is in the range of from 325° C. (617° F.) to 440° C. (824° F.), more preferred, such temperature is in the range of from 350° C. (662° F.) to 435° C. (815° F.).

Most preferred, the low-temperature calcination temperature is in the range of from 400° C. (752° F.) to 435° C. (815° F.).

The low-temperature calcination is conducted for a time period necessary to provide for the desired amount of calcination and a calcined catalyst particle having the properties described herein. Typically, the low-temperature calcinations is conducted for a period of time in the range of from 0.1 hours to 24 hours. A more typical time period, however, is from 0.5 hours to 12 hours.

The calcined catalyst particle should have a nickel metal acid extractability property that is at least 50%. The methodology for measuring or determining the nickel metal acid extractability of a given catalyst is described in detail in Example 3 below. The temperature at which the low-temperature calcination of the impregnated support particle is conducted is preferably controlled so as to provide the desired nickel metal acid extractability property, which is at least 50%. However, a preferred nickel metal acid extractability property for the calcined catalyst particle is at least or greater than 55%, and, more preferred, it is greater than 60%. It is most preferred for the nickel metal acid extractability property to be greater than 65%. There may be a practical upper limit for the nickel metal acid extractability property, but it is not known. It possibly can be a nickel metal acid extractability property of less than 98% or even less than 90%.

In addition to the nickel metal acid extractability property of the calcined catalyst particle, the calcined catalyst particle can further be characterized by certain of its pore structure properties such as total pore volume, mean pore diameter, and surface area. The total pore volume of the calcined catalyst particle typically exceeds 0.5 cc/g and may be in the range of from 0.5 cc/g to 1 cc/g. The percentage of the total pore volume that is contained in the pores having a diameter in the range of from 70 Å to 150 Å is in the range of from 50% to 98%. It is preferred that from 60% to 97% of the total pore volume of the calcined particle to be contained in its pores having a diameter in the range of from 70 Å to 150 Å. It is more preferred for from 70% to 95% of the total pore volume of the calcined particle to be contained in its pores having a diameter in the range of from 70 Å to 150 Å. The mean pore diameter of the calcined catalyst typically can be in the range of form 80 Å to 130 Å.

The calcined catalyst particles can have a surface area (determined by the BET method employing $N_2$, ASTM test method D 3037) that is in the range of from 75 m$^2$/g to 450 m$^2$/g preferably from 100 m$^2$/g to 400 m$^2$/g, and, most preferably, from 150 m$^2$/g to 350 m$^2$/g.

The catalyst composition of the invention may be employed as a part of any suitable reactor system that provides for contacting it or a derivative thereof with a hydrocarbon feedstock under suitable hydroprocessing conditions that may include the presence of hydrogen and an elevated total pressure and temperature. Such suitable reaction systems can include fixed catalyst bed systems, ebullating catalyst bed systems, slurried catalyst systems, and fluidized catalyst bed systems. The preferred reactor system is that which includes a fixed bed of the inventive catalyst contained within a reactor vessel equipped with a reactor feed inlet means, such as a feed nozzle, for introducing the hydrocarbon feedstock into the reactor vessel, and a reactor effluent outlet means, such as an effluent outlet nozzle, for withdrawing the reactor effluent or the treated hydrocarbon product from the reactor vessel.

The hydroprocessing process generally operates at a hydroprocessing reaction pressure in the range of from 689.5 kPa (100 psig) to 13,789 kPa (3000 psig), preferably from 1896 kPa (275 psig) to 10,342 kPa (22500 psig), and, more preferably, from 2068.5 kPa (300 psig) to 8619 kPa (2350 psig).

The hydroprocessing reaction temperature is generally in the range of from 200° C. to 450° C., preferably, from 260° C. to 415° C., and, most preferably, from 320° C. to 410° C.

The flow rate at which the hydrocarbon feedstock is charged to the reaction zone of the inventive process is generally such as to provide a liquid hourly space velocity (LHSV) in the range of from 0.01 hr$^{-1}$ to 10 hr$^{-1}$. The term "liquid hourly space velocity", as used herein, means the numerical ratio of the rate at which the hydrocarbon feedstock is charged to the reaction zone of the inventive process in volume per hour divided by the volume of catalyst contained in the reaction zone to which the hydrocarbon feedstock is charged. The preferred LHSV is in the range of from 0.05 hr$^{-1}$ to 5 hr$^{-1}$, more preferably, from 0.1 hr$^{-1}$ to 3 hr$^{-1}$ and, most preferably, from 0.15 hr$^{-1}$ to 2 hr$^{-1}$.

It is preferred to charge hydrogen along with the hydrocarbon feedstock to the reaction zone of the inventive process. In this instance, the hydrogen is sometimes referred to as hydrogen treat gas. The hydrogen treat gas rate is the amount of hydrogen relative to the amount of hydrocarbon feedstock charged to the reaction zone and generally is in the range upwardly to 1781 m$^3$/m$^3$ (10,000 SCF/bbl). It is preferred for the treat gas rate to be in the range of from 89 m$^3$/m$^3$ (500 SCF/bbl) to 1781 m$^3$/m$^3$ (10,000 SCF/bbl), more preferably, from 178 m$^3$/m$^3$ (1,000 SCF/bbl) to 1602 m$^3$/m$^3$ (9,000 SCF/bbl), and, most preferably, from 356 m$^3$/m$^3$ (2,000 SCF/bbl) to 1425 m$^3$/m$^3$ (8,000 SCF/bbl).

The following examples are presented to illustrate certain aspects of the invention, but they are not to be construed as limiting the scope of the invention.

Example 1

This Example 1 describes the preparation and composition of one exemplary catalyst composition according to the invention.

Table 1 shows the components used in preparing the inventive catalyst of this Example 1 that include a molybdenum component, a nickel component, a phosphorus component, and an alumina component.

TABLE 1

| Source | % metal | wt. % metal oxide |
|---|---|---|
| MoO$_3$ | 9.5 Mo | 14.25 |
| NiO | 3.5 Ni | 4.41 |
| H$_3$PO$_4$ (85%-Aldrich) | 1.5 P | 3.37 as (P$_2$O$_5$) |
| alumina | n/a | 77.97 |

The alumina support particle was made by mixing (mulling) alumina (Al$_2$O$_3$) with 1 wt % Ni as nickel nitrate (wt % based on total weight of alumina and nickel nitrate), nitric acid and water so as to provide an extrudable mixture or paste. This extrudable mixture was extruded to form trilobed support particles. The support particles were then dried at 107° C. followed by calcining for one hour at 649° C. (1200° F.) to provide calcined support particles. The calcined support particles, comprising alumina as the inorganic oxide material, had the characteristics shown in Table 2.

TABLE 2

| Properties of the Alumina Support of Table 1 | |
| --- | --- |
| Surface Area (N$_2$), m$^2$/g | 287 |
| Median Pore Diameter Å | 98 |
| Total Hg Pore Volume, cc/g | 0.827 |

The aqueous impregnation solution used to incorporate the metal components of the catalyst composition into the calcined support particles was prepared by combining NiO, MoO$_3$ and H$_3$PO$_4$ with deionized water and heating the components at 93° C. while stirring until the solution was clear (about 2 hours). The nickel-to-molybdenum atomic ratio of the aqueous impregnation solution was in the range of from 0.4 to 0.75. The aqueous impregnation solution was allowed to cool before its use and had a pH of 2.19.

Following cooling of the aqueous impregnation solution, it was combined with the calcined support particles. The aqueous impregnation solution and calcined support particles were allowed to age for 2 hours with occasional shaking. The impregnated support particles were then dried for four hours at 100° C. resulting in dried impregnated support particles having a bulk density of 0.75 g/ml. The loss on ignition was measured at 6.60%.

The dried impregnated support particles were then calcined at 427° C. (800° F.) for two hours resulting in a calcined particle having a N$_2$ surface area of 204 m$^2$/g and a compacted bulk density of 0.67 g/ml. The total pore volume was 0.583 cc/g. The median pore diameter was 111 Å. The Hg pore size distribution measured by mercury penetration according to ASTM D-4284 for the calcined catalyst particles is shown in Table 3.

TABLE 3

| Hg Pore Size Distribution as Percentage of Total | |
| --- | --- |
| Range in Å | % of total |
| <70 | 1.84 |
| 70-100 | 24.93 |
| 100-130 | 64.08 |
| 130-150 | 5.06 |
| 150-180 | 1.07 |
| 150-200 | 0.37 |
| 200-240 | 0.46 |
| 240-300 | 0.40 |
| 300-350 | 0.16 |
| 350-450 | 0.29 |
| 450-600 | 0.28 |
| 600-1000 | 0.26 |
| 1000-3000 | 0.32 |
| 3000-5000 | 0.07 |
| >5000 | 0.40 |

Example 2

This Example 2 describes the preparation and composition of a second exemplary catalyst composition according to the invention.

Table 4 shows the components used in preparing the inventive catalyst of this Example 2 that include a molybdenum component, a nickel component, a phosphorus component, and an alumina component. The support particle utilized in this Example 2 was the same as in Example 1.

TABLE 4

| Source | % metal | wt. % metal oxide |
| --- | --- | --- |
| MoO$_3$ | 9.5 Mo | 14.3 |
| NiO | 3.5 Ni | 4.45 |
| H$_3$PO$_4$ | 1.5 P | 3.4 as (P$_2$O$_5$) |
| alumina | 77.8 | 77.8 |

The aqueous impregnation solution used to incorporate the metal components of the catalyst composition into the calcined support particles was prepared by combining NiO, MoO$_3$ and H$_3$PO$_4$ with deionized water and heating the components at 93° C. while stirring until the solution was clear (about 2 hours). The nickel-to-molybdenum atomic ratio of the aqueous impregnation solution was in the range of from 0.5 to 0.75.

Following cooling of the aqueous impregnation solution, it was combined with the calcined support particles. The aqueous impregnation solution and calcined support particles were allowed to age for 2 hours with occasional shaking.

The impregnated support particles were then divided into two portions with the first portion being dried for 1 hour at 121° C., and the second portion being dried for four hours at 100° C. Both portions were calcined for two hours at 427° C. resulting in calcined particles having a compacted bulk density of 0.672 g/cc for the sample dried at 121° C. and 0.678 g/cc for the sample dried at 100° C.

The Hg pore size distribution for the calcined particles is shown in Table 5.

TABLE 5

| Hg Pore Size Distribution as Percentage of Total | | |
| --- | --- | --- |
| Range in Å | % of total (121° C.) | % of total (100° C.) |
| <70 | 1.82 | 1.84 |
| 70-100 | 27.50 | 26.92 |
| 100-130 | 61.95 | 62.25 |
| 130-150 | 4.09 | 4.53 |
| 150-180 | 1.24 | 1.20 |
| 150-200 | 0.46 | 0.43 |
| 200-240 | 0.51 | 0.54 |
| 240-300 | 0.41 | 0.43 |
| 300-350 | 0.23 | 0.23 |
| 350-450 | 0.30 | 0.29 |
| 450-600 | .031 | 0.28 |
| 600-1000 | 0.29 | 0.27 |
| 1000-3000 | 0.42 | 0.36 |
| 3000-5000 | 0.11 | 0.10 |
| >5000 | 0.36 | .031 |

Example 3

This example describes an acid extraction procedure that may be used to determine the nickel metal acid extractability property of the inventive impregnated support particle that has been subjected to a controlled low-temperature calcination to provide the calcined catalyst particle in accordance with the invention.

Generally speaking, the acid extraction procedure is conducted by subjecting a nickel-containing catalyst sample, such as the calcined catalyst particle of the invention, to an acid extraction using a dilute aqueous hydrochloric acid solution and determining the percent nickel that is extracted therefrom. The percent nickel that is extracted from the nickel-containing catalyst sample by this procedure is reported as the acid extractability property of the nickel-containing catalyst. As discussed elsewhere herein, a higher value for the nickel metal acid extractability property is indicative of a higher percentage of loosely bound nickel in the alumina matrix of the calcined catalyst particle than in a calcined catalyst particle having a lower value for its nickel metal acid extractability property; and, thus, indicating a more active catalyst.

More specifically, the acid extraction procedure is conducted by determining the amount of nickel that is contained in a sample of nickel-containing catalyst and placing a measured weight (e.g., grams) of the nickel-containing catalyst sample into a container. A measured amount (e.g., milliliters) of dilute aqueous hydrochloric acid solution having a concentration of 0.98% is then placed into the container with the measured amount of the nickel-containing catalyst sample. The ratio of weight of nickel-containing catalyst sample in grams to the volume of dilute aqueous hydrochloric acid solution in milliliters is 0.5 gm/ml.

The container is sealed, and the contents are rotated for one hour while maintaining the contents at a temperature between about 17 to 30° C. After the rotation is complete, the aqueous hydrochloric acid solution is then separated from the nickel-containing catalyst sample particles by filtration and analyzed using any suitable method for measuring the nickel content of the solution, such as, for example, by x-ray fluorescence (XRF), to determine the amount of nickel extracted from the catalyst sample. The nickel metal acid extractability property of the catalyst sample is calculated and reported as the weight percent of nickel contained in the original sample of impregnated and calcined catalyst particles that is extracted therefrom by the dilute aqueous hydrochloric acid solution.

The specific acid extraction procedure used herein to measure the nickel metal extractability property of the catalyst composition of the invention is described as follows.

1. A sample amount of catalyst particles is dried in an oven set at 300±10° C. for one hour±10 minutes. The catalyst particles of the sample are not ground.
2. The sample of dried catalyst particles is placed in a dessicator and allowed to cool for at least approximately 20 minutes.
3. A stock dilute HCl acid solution, prepared by combining 10 volume units of concentrated HCl (36.5-38%) with 390 volume units of deionized (DI) water, is used in the acid extraction procedure for determining the nickel metal acid extractability property of the sample of catalyst particles.
4. 10.0±0.5 grams of the pre-dried sample catalyst particles and 20±0.5 ml of the stock dilute HCl acid solution are placed into a 125 ml bottle container that is then capped and placed on a roller assembly that is rotated for one hour±5 minutes at a rate of approximately 60 rpm.
5. When the rolling is complete, the extraction liquid is separated from the catalyst particles and analyzed for its nickel content, which value is used to calculate the percentage nickel metal contained in the original catalyst particles that is extracted by the stock dilute HCl acid solution and to provide the nickel metal acid extractability property for the sample of catalyst particles.
6. The nickel metal acid extractability property is reported as weight percent (%) of the total nickel content of the original catalyst particles, before the acid extraction treatment, that is extracted with the stock dilute HCl acid solution in the acid extraction treatment procedure.

Samples of the calcined particles produced in accordance with Examples 1 and 2 were tested to determine their nickel metal acid extractability property. The nickel metal acid extractability property of the calcined particles of Example 1 was measured to be 62%. The nickel metal acid extractability property of the calcined particles of Example 2 that were dried at 121° C. was measured to be 61% and that of the calcined particles of Example 2 that were dried at showed at 100° C. was measured to be 63%.

Example 5

This Example 5 generally describes the testing procedure used to determine various of the performance properties of the inventive catalyst compositions described in Examples 1 and 2, and a comparison catalyst composition, and it presents summary information by use of the plots presented in FIGS. 1-4.

FIGS. 1-4 illustrate the improved hydrodesulfurization, hydrodenitrogenation and MCR conversion capabilities of the inventive catalyst relative to such properties of a comparison catalyst when used in a simulated commercial reactor testing apparatus to treat a typical heavy hydrocarbon feedstock.

The comparison catalyst was a commercially available resid hydrotreating catalyst prepared using an impregnation technique to incorporate the active nickel and molybdenum metal components into an alumina support. The alumina support did not contain a nickel component when the active metals were incorporated onto it. The comparison catalyst contained 8.2 weight percent molybdenum, reported as metal and not as an oxide, 2.3 weight percent nickel, reported as metal and not as an oxide, and no phosphorous. The nickel metal acid extractability property of the comparison catalyst was less than 30%.

The feed was a heavy feedstock characterized as follows: T10=582° F.; T90=1283° F.; End Point=1351° F.; sulfur content=1.1 wt. %; nitrogen content=1760 ppm.

The reaction conditions were as follows: reaction pressure=1900 psig; $H_2$/Oil=4000 SCF/bbl; and weight hourly space velocity (WHSV)=0.5 $hr^{-1}$.

In the FIGS., the black circles represent the reference catalyst data points and the open circles represent the inventive catalyst data points.

FIG. 1 illustrates that the catalyst composition according to the invention provides for a significant improvement in sulfur conversion as compared to the reference catalyst. It may also be seen from FIG. 1 that, while the degree of sulfur conversion for the inventive catalyst declines over time, this rate of decline in sulfur conversion is slightly lower than the rate of decline exhibited by the reference catalyst.

Figure 2:
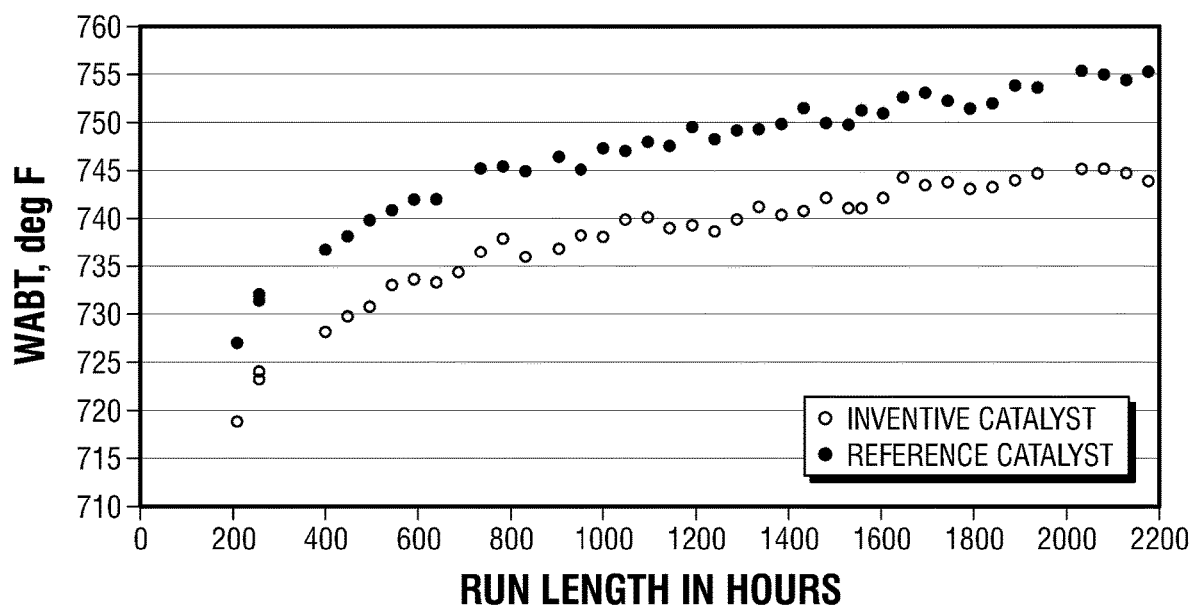
FIG. 2 is a graph illustrating the weight average bed temperature (WABT) achieved by use in hydrotreating a heavy feedstock of a composition representative of an inventive catalyst produced according to the invention relative to the WABT achieved with a reference catalyst.

FIG. 2 illustrates that the catalyst composition according to the invention provides for significantly lower weight average bed temperatures (WABT) for a given desulfurization level than does the comparison catalyst. A lower WABT is advantageous; because, it provides for significant energy savings in the hydroprocessing of a heavy hydrocarbon feedstock.

Figure 3:
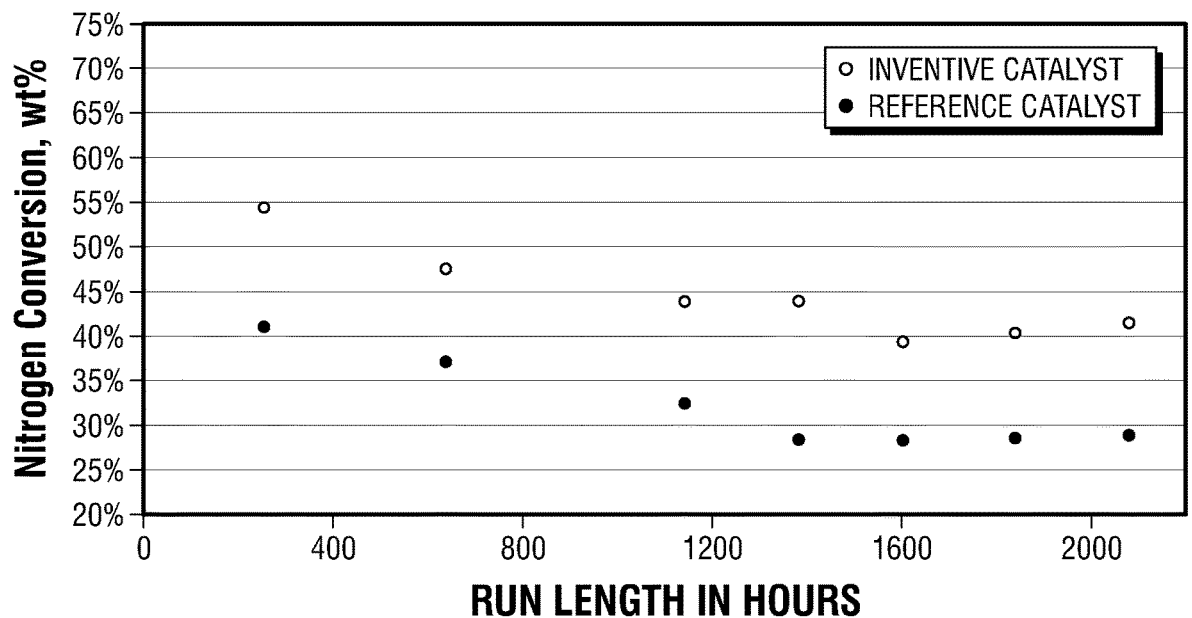
FIG. 3 is a graph illustrating nitrogen conversion achieved by use in hydrotreating a heavy feedstock of a composition representative of an inventive catalyst produced according to the invention in comparison to the nitrogen conversion achieved with a reference catalyst.
Figure 4:
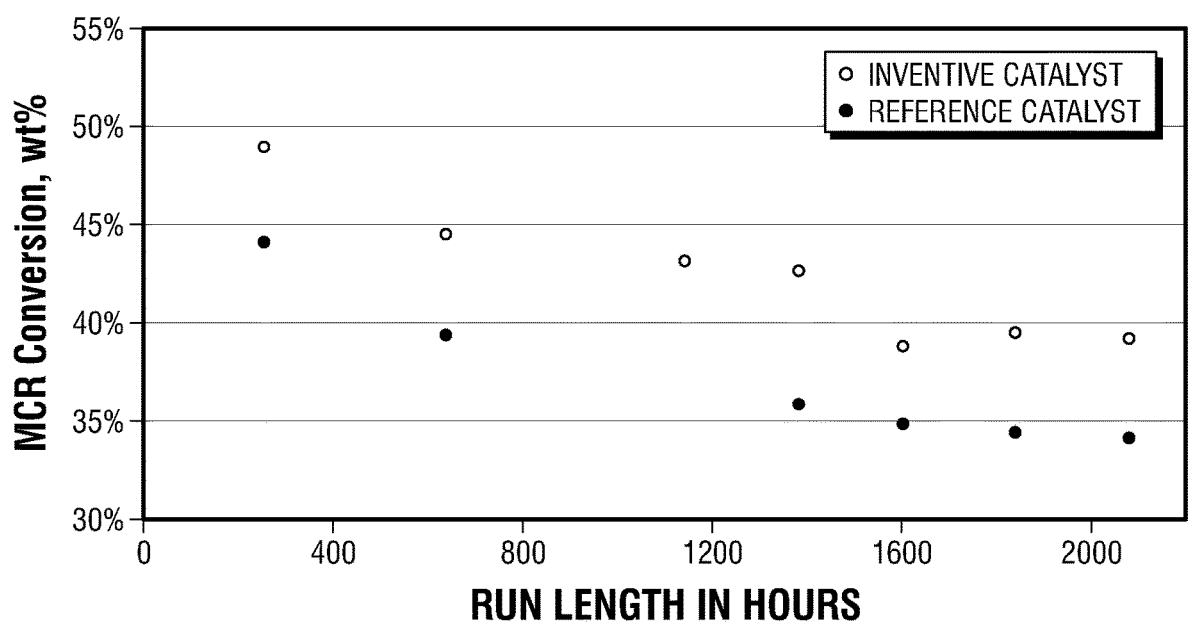
FIG. 4 is a graph illustrating MCR conversion achieved by use in hydrotreating a heavy feedstock of a composition representative of an inventive catalyst produced according to the invention in comparison to the MCR conversion achieved with a reference catalyst.

FIGS. 3 and 4 show that the inventive catalyst composition also provides for improved conversion rates for both nitrogen and micro-carbon residue (MCR), respectively, as compared to the comparison catalyst.

It is understood that while particular embodiments of the invention have been described herein, reasonable variations, modifications and adaptations thereof may be made that are within the scope of the described disclosure and the appended claims without departing from the scope of the invention as defined by the claims.

That which is claimed is:

1. A catalyst composition, comprising: an impregnated calcined support particle, having been subjected to a controlled low-temperature calcination to provide a calcined particle, wherein said calcined particle comprises a Group 6 metal component, a nickel component and a phosphorus component, and wherein said calcined particle has an atomic ratio of the nickel metal to the Group 6 metal is in the range of from 0.5 and 0.75, and wherein said calcined particle has a nickel metal acid extractability property of at least 50%.

2. The catalyst composition according to claim 1, wherein said calcined particle contains: said Group 6 metal component in an amount in the range of from 8 wt % to 18 wt %; said nickel component in an amount in the range of from 2 wt % to 7 wt %; and said phosphorus component in an amount in the range of from 0.8 wt % to 4 wt %, all of which are based on the weight of calcined particle and the metal components as oxides regardless of their actual form.

3. The catalyst composition according to claim 2, wherein said Group 6 metal component is molybdenum.

4. The catalyst composition according to claim 3, wherein the total quantity of phosphorus in said calcined catalyst particle, calculated as phosphorus pentoxide, is greater than 10% of the total quantity of said Group 6 metal component in said calcined catalyst particle, calculated as molybdenum trioxide.

5. The catalyst composition according to claim 4, wherein said calcined catalyst particle has a surface area that exceeds 150 m$^2$/g.

6. The catalyst composition according to claim 5, wherein said calcined catalyst particle has a mean pore diameter in the range of from 80 Å to 100 Å.

7. The catalyst composition according to claim 6, wherein said calcining step comprises calcining said particle between 370° C. (698° F.) and 538° C. (1000° F.).

8. A hydrotreating process, comprising: contacting a catalyst composition with a hydrocarbon feedstock under hydrotreating process conditions and yielding a hydrotreated hydrocarbon product, wherein said catalyst composition comprises an impregnated calcined support particle, having been subjected to a controlled low-temperature calcination to provide a calcined particle, wherein said calcined particle comprises a Group 6 metal component, a nickel component and a phosphorus component, and wherein said calcined particle has an atomic ratio of the nickel metal to the Group 6 metal is in the range of from 0.5 and 0.75, and wherein said calcined particle has a nickel metal acid extractability property of at least 50%.

9. The hydrotreating process according to claim 8, wherein said calcined particle contains: said Group 6 metal component in an amount in the range of from 8 wt % to 18 wt %; said nickel component in an amount in the range of from 2 wt % to 7 wt %; and said phosphorus component in an amount in the range of from 0.8 wt % to 4 wt %, all of which are based on the weight of calcined particle and the metal components as oxides regardless of their actual form.

10. The hydrotreating process according to claim 9, wherein said Group 6 metal component is molybdenum.

11. The hydrotreating process according to claim 10, wherein the total quantity of phosphorus in said calcined catalyst particle, calculated as phosphorus pentoxide, is greater than 10% of the total quantity of said Group 6 metal component in said calcined catalyst particle, calculated as molybdenum trioxide.

12. The hydrotreating process according to claim 11, wherein said calcined catalyst particle has a surface area that exceeds 150 m$^2$/g.

13. The hydrotreating process according to claim 12, wherein said calcined catalyst particle has a mean pore diameter in the range of from 80 Å to 100 Å.

14. The hydrotreating process according to claim 13, wherein said calcining step comprises calcining said particle between 370° C. (698° F.) and 538° C. (1000° F.).

15. A composition proposed by the steps of:
incorporating a nickel compound into a support particle comprising an inorganic oxide material;
conducting a high-temperature calcination of the support particle so as to provide a calcined support particle;
impregnating said calcined support particle with an aqueous impregnation solution, wherein said aqueous impregnation solution comprises a Group 6 metal compound, a nickel compound and a phosphorus compound, and wherein said aqueous impregnation solution has an atomic ratio of nickel metal to a Group 6 metal in the range of from 0.5 to 0.75, to thereby provide an impregnated support particle; and
conducting a controlled low-temperature calcination of said impregnated support particle at a low calcination temperature of less than 450° C. (842° F.) so as to thereby provide a calcined catalyst particle having a nickel metal acid extractability property of at least 40%.

16. The composition according to claim 15, wherein said calcined catalyst particle contains: a Group 6 metal component in an amount in the range of from 8 wt % to 18 wt %; a nickel component in an amount in the range of from 2 wt % to 7 wt %; and a phosphorus component in an amount in the range of from 0.8 wt % to 4 wt %, all of which are based on the weight of calcined catalyst particle and the metal components as oxides regardless of their actual form.

17. The composition according to claim 16, wherein said Group 6 metal component is molybdenum.

18. The composition according to claim 17, wherein the total quantity of phosphorus in said calcined catalyst particle, calculated as phosphorus pentoxide, is greater than 10% of the total quantity of said Group 6 metal component in said calcined catalyst particle, calculated as molybdenum trioxide.

19. The composition according to claim 18, wherein said calcined catalyst particle has a surface area that exceeds 150 m$^2$/g,
wherein said calcined catalyst particle has a mean pore diameter in the range of from 90 Å to 120 Å, and
wherein said low calcination temperature is in the range of from 300° C. (572° F.) to less than 450° C. (842° F.).

* * * * *